United States Patent
Imahashi et al.

(10) Patent No.: US 11,926,551 B2
(45) Date of Patent: Mar. 12, 2024

(54) WATER TREATMENT SYSTEM AND WATER TREATMENT METHOD

(71) Applicant: Oxum, Inc., Kamakura (JP)

(72) Inventors: Kageto Imahashi, Kamakura (JP); Isao Ishida, Kamakura (JP)

(73) Assignee: Oxum, Inc., Kamakura (JP)

(*) Notice: Subject to any disclaimer, the term of this patent is extended or adjusted under 35 U.S.C. 154(b) by 0 days.

(21) Appl. No.: 18/000,395

(22) PCT Filed: May 18, 2021

(86) PCT No.: PCT/JP2021/018787
§ 371 (c)(1),
(2) Date: May 10, 2023

(87) PCT Pub. No.: WO2021/246160
PCT Pub. Date: Dec. 9, 2021

(65) Prior Publication Data
US 2023/0278901 A1  Sep. 7, 2023

(30) Foreign Application Priority Data
Jun. 2, 2020 (JP) .................. 2020-096057

(51) Int. Cl.
*C02F 9/00* (2023.01)
*C02F 103/00* (2006.01)

(52) U.S. Cl.
CPC .......... *C02F 9/00* (2013.01); *C02F 2103/001* (2013.01); *C02F 2103/005* (2013.01);
(Continued)

(58) Field of Classification Search
None
See application file for complete search history.

(56) References Cited

U.S. PATENT DOCUMENTS

2002/0008065 A1  1/2002  Elston
2005/0139530 A1*  6/2005  Heiss .................. C02F 9/00
210/257.2
(Continued)

FOREIGN PATENT DOCUMENTS

JP  H1072858 A  3/1998
JP  H1077673 A  3/1998
(Continued)

OTHER PUBLICATIONS

Jan. 11, 2022, Decision to Grant a Patent issued by the Japan Patent Office in the corresponding Japanese Patent Application No. 2020-096057.
(Continued)

*Primary Examiner* — Richard C Gurtowski
(74) *Attorney, Agent, or Firm* — KENJA IP LAW PC

(57) ABSTRACT

Provided is a water treatment system 50 having: a first unit 100 having a dirty water generation source; a second unit 200 designed to purify water, the second unit 200 having at least one of a purification tank, a solid-liquid separation tank, and an oil separation tank, and conducting a primary treatment of contaminated water that is received; and a third unit 300 having a contaminated-water inlet, a primary reception tank, an intermediate treatment tank, a reserve treatment tank, a circulation treatment tank, a concentrated water and impurity tank, and an aseptic drainage tank. Each of the first to third units is equipped with a sensor and a valve. The third unit is furthermore equipped with a control device and at least one of a pump, a sterilization device, a disinfection device, and a sterilizer.

16 Claims, 12 Drawing Sheets

(52) U.S. Cl.
CPC .. *C02F 2201/005* (2013.01); *C02F 2201/008* (2013.01); *C02F 2201/009* (2013.01); *C02F 2209/005* (2013.01); *C02F 2209/42* (2013.01); *C02F 2303/04* (2013.01)

(56) References Cited

U.S. PATENT DOCUMENTS

| 2010/0105128 A1* | 4/2010 | Rezin | C02F 3/1242 |
| | | | 435/262.5 |
| 2020/0346963 A1 | 11/2020 | Kurayama et al. | |

FOREIGN PATENT DOCUMENTS

| JP | 2005248548 A | 9/2005 |
| JP | 2007002490 A | 1/2007 |
| JP | 2015016402 A | 1/2015 |
| JP | 2015196956 A | 11/2015 |
| WO | 2019131745 A1 | 7/2019 |

OTHER PUBLICATIONS

Jul. 13, 2021, International Search Report issued in the International Patent Application No. PCT/JP2021/018787.

Oct. 26, 2021, Notification of Reasons for Refusal issued by the Japan Patent Office in the corresponding Japanese Patent Application No. 2020-096057.

Oct. 4, 2022, Notification of Reasons for Refusal issued by the Japan Patent Office in the corresponding Japanese Patent Application No. 2020-008781.

Jan. 8, 2024, the Extended European Search Report issued by the European Patent Office in the corresponding European Patent Application No. 21817756.6.

* cited by examiner

WATER TREATMENT SYSTEM AND WATER TREATMENT METHOD

TECHNICAL FIELD

The present invention relates to a technique for successfully expanding a water treatment system, depending on the type of domestic drainage water, the scale of a toilet or restroom or the environment for installing such a facility to suitably treat drainage water.

BACKGROUND ART

Various conventional techniques have been proposed to successfully purify and recycle drainage water discharged from facilities such as toilets or sinks.

Herein, for example, Patent Document 1 discloses a toilet drain treatment facility for use at the time of disaster, including sewage disposal tanks, a pump, an emergency power generator, water tanks, toilets, and water diversion devices that divert channels of drain from the toilets to the sewage disposal tanks or an existing sewerage system. The sewage disposal tanks are used for water storage at normal times. At the time of disaster, the water stored in the sewage disposal tanks at normal times is sent to the water tanks to be stored using the electricity generated by the emergency power generator for operating the pump. The stored water is then used as toilet flushing water, and the drain from the toilets is sent to the sewage disposal tanks by the water diversion devices to store and/or treat the drain from the toilets.

CITATION LIST

Patent Literature

Patent Document 1: JP-A-2015-196956 A

SUMMARY OF INVENTION

Technical Problem

Generally, toilets or restrooms that are connected to the infrastructure fail to function if no water is constantly supplied or discharged, e.g., if any water is not available from water or other tanks due to disasters or droughts. At the time of disaster, an emergent water source can be rain water or river water, but the above facilities cannot function without discharging water or storing water to be discharged. Moreover, the use of domestic water or toilet water by a large number of unspecified people can easily cause unidentified external contamination, including infectious diseases. In addition, a remote contaminated water treatment itself brings about high transportation costs, maintenance costs and management burdens.

Lack of toilets causes problems with public hygiene, including inevitable use of a cesspool and its limited capacity for temporary toilets, and much time required for activating microorganisms in biological treatment for circulation-type toilets. Furthermore, in cases where water conservation, effective use of resources, and reduction in burdens on the infrastructure are intended, concentrated dirty water and impurities are inevitably discharged to remove foreign matter with a filter. Also, it is regularly necessary to separate solids from liquids and remove precipitate referred to as sludge in purification tanks and other tanks. In locations where no sewerage system is prepared, soil osmotic treatment generates high contamination burdens on the environment. In addition, if the entire device, e.g., channels including filters, are not sterilized, disinfected or antisepticized as needed, maintenance operations can contaminate the exterior.

Another problem with recycling drainage water and dirty water in such a conventional water treatment system is an inability to transport and expand the system, and change the volume of water available. Specifically, the conventional system fails to have the scale, elements, and locations selected as needed, in particular, per user. The circulating water is not normally essential at infrastructure-built locations in consideration of cost performance and other factors, but it is difficult to transport and install the water treatment system as needed, and elements required for urgent water treatment cannot be divided for only existing equipment to be mounted, installed and transported. Another drawback is no additional combinations of sensors or control devices in use.

The invention in the above-mentioned Patent Document 1 cannot expand the scale of a water treatment system on the side of a dirty water treatment tank and water tanks, depending on the number of installed toilets and other factors, and fails to focus on the effect of the required scale expansion on the system.

Under the circumstances described above, an object of the present invention is to optionally expand a unit provided with a purification tank or a solid-liquid separator, a unit provided with each type of treatment device and other units, depending on the scale of a toilet or restroom or the environment for installation locations, to suitably treat drainage water.

Solution to Problem

To solve the aforementioned problem, a water treatment system according to one aspect of the present invention includes: a first unit having a generation source of dirty water containing overall domestic drainage water and toilet sewage water; a second unit having at least any of a purification tank, a solid-liquid separation tank, and an oil separation tank intended to purify water, regardless of anaerobic aeration or aerobic aeration, and conducting a primary treatment of dirty water received; and a third unit having a dirty-water inlet and further having a primary reception tank, an intermediate treatment tank, a reserve treatment tank, a circulation treatment tank, a concentrated water and impurity tank, and an aseptic drainage tank, in which each of the first to third units includes a sensor and a valve, the third unit further includes a control device and at least any of a pump, a sterilization device, a disinfection device, and a sterilizer, in which the control device performs centralized control of at least any of the valve, the pump, the sterilization device, the disinfection device, and the sterilizer, based on sensor data from the sensor of each of the first to third units.

Advantageous Effects of Invention

An object of the present invention is to provide a technique for successfully optionally expanding a unit provided with a purification tank or a solid-liquid separator and a unit provided with each type of treatment device, depending on the type of a dirty water generation source, the scale of a toilet or restroom, or the environment for installation locations to suitably treat drainage water and prevent the inside and outside of the devices from being contaminated by harmful substances such as bacteria and viruses.

DESCRIPTION OF EMBODIMENTS

Hereinafter, with reference to the drawings, embodiments of the present invention will be described.

First Embodiment

A water treatment system according to a first embodiment of the present invention recycles used water and sewage water at toilets or restrooms. For example, used water and sewage water at toilets or restrooms provided in the infrastructure can also be recycled. In addition, even during a stop of a water supply and drainage infrastructure at the time of disaster, used water and sewage water at toilets or restrooms can be recycled. Meanwhile, toilets or restrooms can be provided even in cases where no sewerage system, but a tap water system is prepared. The system itself can be transported by each unit, and toilets or restrooms can be provided when the connection to the infrastructure is difficult or unnecessary.

Figure 1:
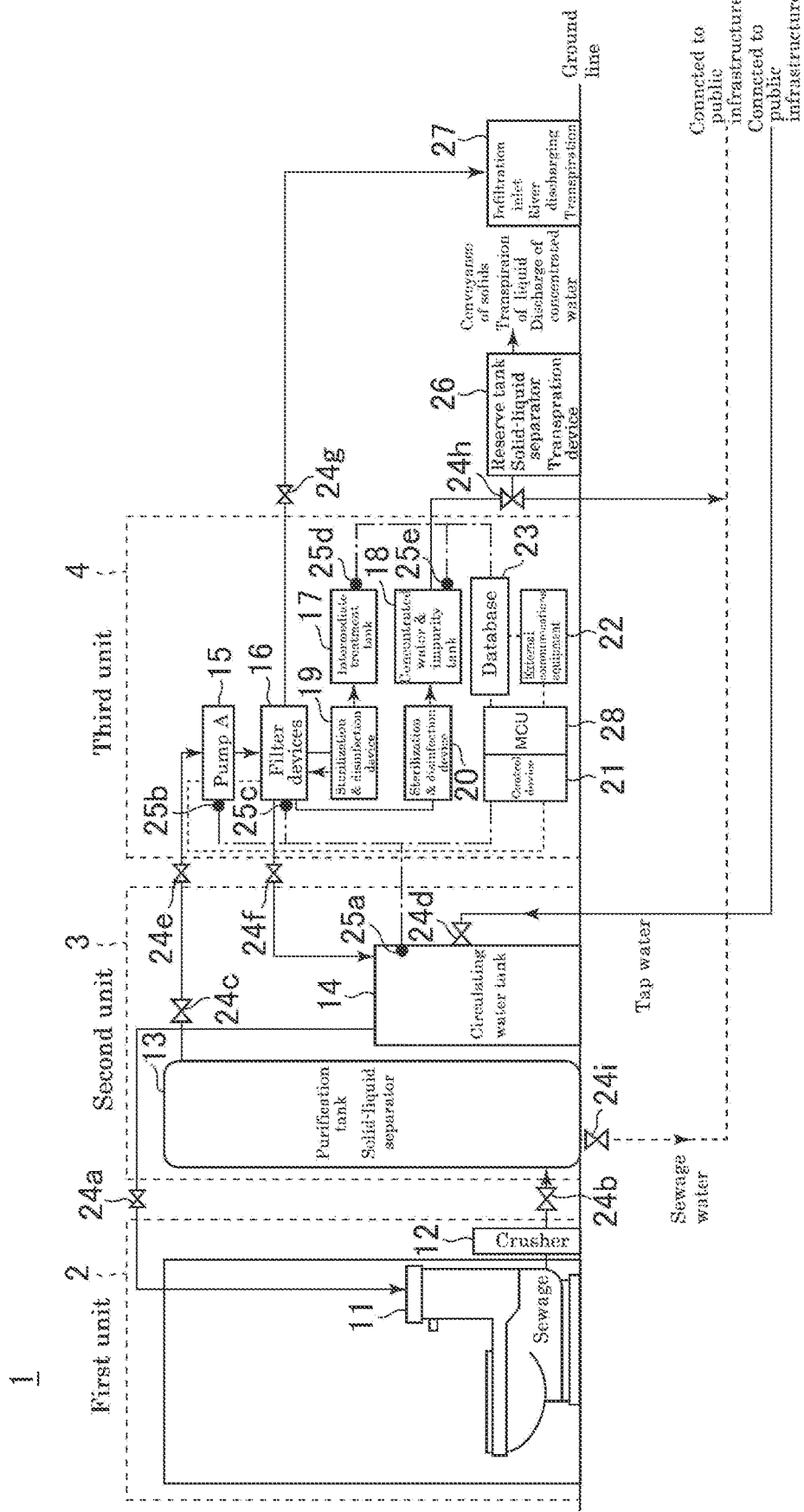
FIG. 1 is a block diagram of a water treatment system according to a first embodiment of the present invention.

FIG. 1 illustrates and describes the configuration of the water treatment system according to the first embodiment of the present invention.

As illustrated in the figure, the water treatment system 1 is mainly composed of any combination of a first unit 2, a second unit 3, and a third unit 4. The units are connected via valves 24a, 24b, 24e, 24f.

The first unit 2 includes a toilet (or a restroom) 11, as well as a crusher 12. The second unit 3 includes a purification tank, a solid-liquid separator 13, a circulating water tank 14, a sensor 25a, and valves 24c, 24d. The third unit 4 includes an intermediate treatment tank 17, a concentrated water and impurity tank 18, filter devices 16, a pump 15, sensors 25b to 25e, a control device 21, an external communications equipment 22, a database 23, and an MCU (Micro Control Unit) 28.

The drainage water from the purification tank, the solid-liquid separator 13 of the second unit 3 is sent to a sewerage system, and tap water is used as cleaning water for toilets in the first unit 2 (or water for restrooms) while the circulating water tank 14 is filled with the tap water, which constantly enables biological treatment in the purification tank and the solid-liquid separator 13 to be ready for reception, allowing the drainage water to flow not into the sewerage system but into a water treatment device in the third unit 4 in case of emergency to readily switch to a recycling mode.

During a maintenance operation in normal use, impurities and sludge in the purification tank, the solid-liquid separator 13 in the second unit 3 do not have to be dipped up, but can directly be flown into the sewerage system. Burdens on the infrastructure can be reduced because treated dirty water is flown into the sewerage system. Also, the second unit 3 can be provided in the required number and used separately to recycle sewage water from restrooms or toilets, depending on stool or urine.

Even without a sewerage system in the neighborhood, the second unit 3, including a purification tank, a solid-liquid separator 13 and a circulating water tank 14 for recycling, and the third unit 4, including a water treatment device for sanitizing circulating water, allow all used water to be provided in circulation. A loss of the water in the circulating water tank 14 is covered by tap water, and impurities and concentrated dirty water generated in the treatment of circulating water is pressure-fed to the sewerage system by a pump. The units are connected by pipes overhead and hoses for water treatment to reduce the volume of dirty water. The infrastructure does not have to be provided underground to installation locations. It is also possible to contain all impurities and sewage water in tanks for sterilization and disinfection, and take the same out of the tanks for water treatment.

In the third unit 4, the control device 21 controls the pump 15 and the filter devices 16 based on sensor data from the sensors 25a to 25e to circulate the water to the toilet (or restroom) 11 provided in conjunction with the first unit 2. The sensor data from the sensors 25a to 25e can be transmitted and received via the external communications equipment 22, regardless of internal, external, wired or wireless system. In this example, the control device 21 receives sensor data to control each portion by comparison and judgment with thresholds, but the configuration is not restricted to that and remote control is also possible.

In the third unit 4, the filter devices 16 are provided with a sterilization and disinfection device 19 in conjunction therewith, and the concentrated water and impurity tank 18 is also provided with a sterilization and disinfection device 20 in conjunction therewith. These devices 19, 20 are driven-controlled by the control device 21. The concentrated water and impurity tank 18 is connected to a reserve tank, a solid-liquid separator, a transpiration device 26 via a valve 24h, and the drainage water is fed to the devices 26 for treatment as needed.

Accordingly, the second unit 3 includes the purification tank, the solid-liquid separator 13 and the circulating water tank 14 intended to recycle water, while the following third unit 4 includes a water treatment device for sanitizing its circulating water. In cases where the units are connected to the tap water and sewerage systems and used to provide toilets or restrooms when the tap water and sewerage system infrastructure fails to function at the time of disaster, the drainage water of the sewage from the purification tank, the solid-liquid separator 13, and the circulating water tank 14 in the second unit 3 is blocked by valves 24d, 24i to take tap water from the circulating water tank 14 and supply the same to the toilet (or restroom) 11 in the first unit 2.

In the water treatment system 1, combinations of the first unit 2, the second unit 3 and the third unit 4 can be selected according to the purpose and scale of use. For example, the third unit 4 can be installed and disconnected as needed.

Therefore, each of the first unit 2 and the second unit 3 does not have to be provided with a single third unit 4. However, the first unit 2 and the second unit 3 must be operated in conjunction with each other or as a pair.

Using the crusher 12 in the first unit 2 and the purification tank, the solid-liquid separator 13 in the second unit 3 at normal times, primary-treated dirty water is flown into the sewerage system to activate biological treatment, and it is immediately served when the system is switched to the circulation mode. A microorganism treatment portion includes equipment for treating the water under suitable environment, based on the temperature, organic substance concentration and other parameters. The valves 24a to 24i can manually and automatically be opened and closed, regardless of above ground or underground. After recycling or advanced-treating water, an infiltration inlet, river discharging, transpiration treatment 27 can be selected for the effluent accordingly.

Thus, the first embodiment of the present invention can remodel toilets or restrooms for emergency and water conservation. Meanwhile, toilets or restrooms can be provided even in locations where no sewerage system, but a tap water system is prepared. Water recycling can readily be provided where needed. In fact, with the exception of existing infrastructure, the system does not require the excavation, and the system can optionally be transported, conveyed and combined.

Second Embodiment

A water treatment system according to a second embodiment of the present invention treats domestic drainage water or used water and sewage water at toilets to recycle water. The water treatment system can add any combinations of second to fifth units including equipment for treating dirty water and recycling water to a first unit including overall life water, toilets and restrooms, connected to the infrastructure. When the water supply and drainage infrastructure fails to function at the time of disaster, used water and dirty water can be recycled, and toilets or restrooms can be used even with no sewerage system, but a tap water system available.

Since device channels including filters can be sterilized, disinfected and antisepticized, contaminants are not allowed to get out of the channels during a maintenance operation. Also, the system can be connected to a device capable of storing and utilizing natural resources. Energy generators such as solar photovoltaic cells and batteries can be mounted on or provided in conjunction with the system as needed.

The entire system or units thereof can be transported, conveyed and mounted on vehicles. Water can readily be treated in any combinations together with a generation source as needed. In addition, water treatment is also possible in any combinations of the volume and flow rate of water.

For the units connected in series or in parallel, the system control can accordingly be selected from the use of the database in each of the units and integration of all the connected units. Specifically, the system can control sensors and a control device in various patterns, change combinations of such apparatuses, and perform centralized control of even more units to be connected.

Herein, "unit" means an element to be installed, a location, or a range, such as a building, a room, or a box- or pallet-like mount regardless of shape, a vehicle, and a case, classified according to a generation source of dirty water, having a connection port capable of external connection at portions that externally face such as a wall of the element for drainage water, dirty water, tap water, electricity, and communications therefrom. The units are readily connected under predetermined standards. At this time, a water-permeable connection port is preferably configured to cause no backflow or leakage when disconnected or connected. Electricity and communications connectors are water-proof or explosion-proof, and easy connection type such as plug construction is preferable. The connection between units by the same standards of connection ports, hoses, and pipes facilitates their attachment and detachment.

Figure 2:
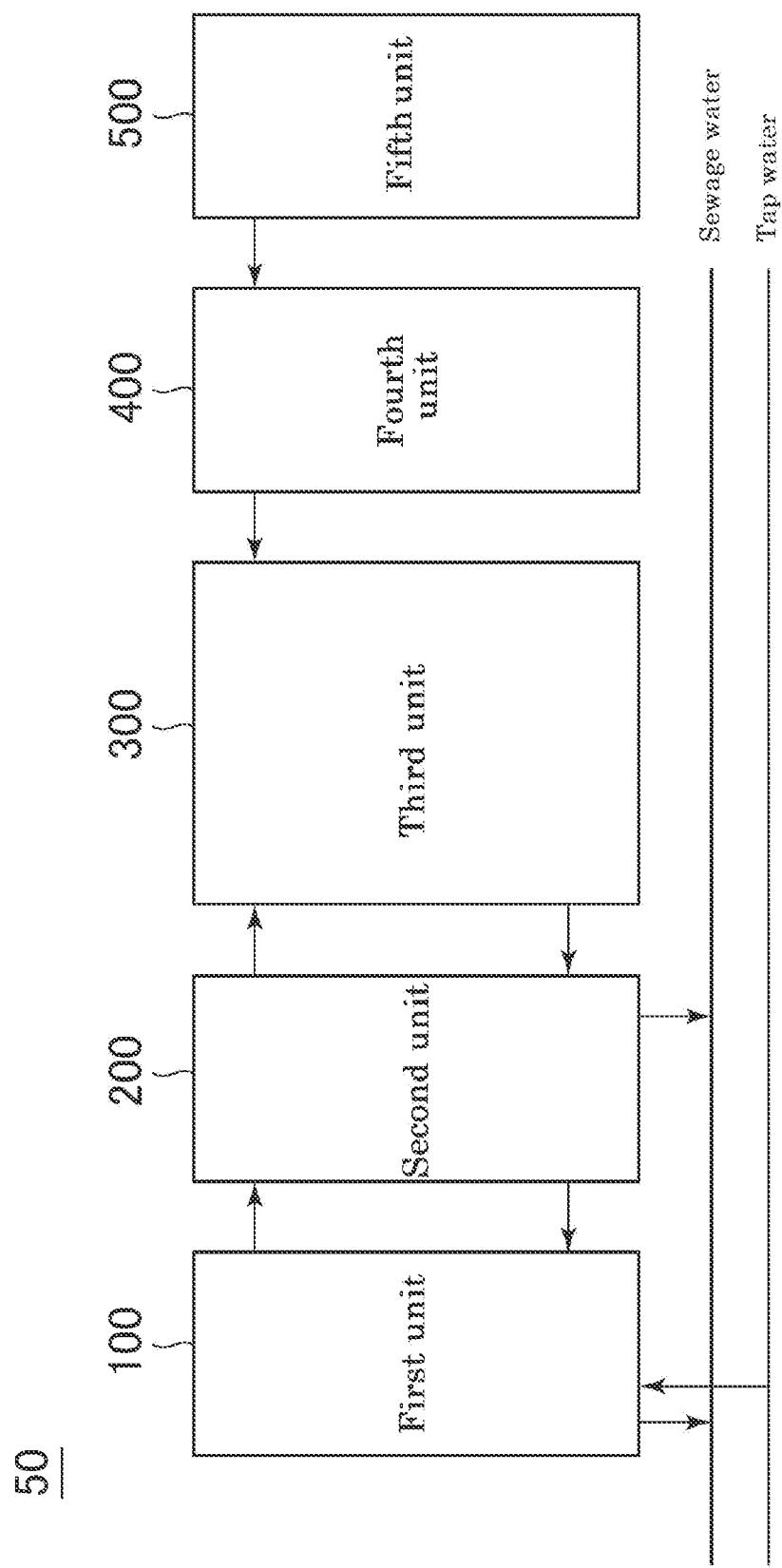
FIG. 2 is a block diagram of a water treatment system according to a second embodiment of the present invention.

FIG. 2 illustrates and describes the configuration of a water treatment system according to a second embodiment of the present invention.

As illustrated in the figure, a water treatment system 50 is composed of any combinations of a first unit 100, a second unit 200, a third unit 300, a fourth unit 400, and a fifth unit 500.

The first unit 100 represents a location, a container, a mount, or a range that installs and stores a generation source of dirty water such as overall domestic drainage water and toilet sewage water. The second unit 200 includes any or all combinations of a purification tank, a solid-liquid separation tank, an oil separation tank, or devices, intended to purify water, regardless of anaerobic aeration or aerobic aeration, and tanks or devices intended for a primary treatment of received dirty water. The third unit 300 is a device having a dirty water inlet and further having a primary reception tank, an intermediate treatment tank, a reserve water tank, a circulating water tank, a concentrated water and impurity tank, and an aseptic drainage tank, and including a valve, a pump, a sterilization device, a disinfection device, and a sterilizer to set thresholds and control the system with a control device based on sensor data.

The fourth unit 400, including a natural resource tank, keeps sterile the water quality in the tank by circulating the water via any or all of the sterilization device, the disinfection device, and the sterilizer, using a circulation pump in order to receive natural resources, rain water, river water, seawater and prevent received water from going rotten. The fifth unit 500, including a decomposition treatment device, is a device intended to further decompose and treat concentrated dirty water and impurities generated in the third unit 300.

With reference to FIGS. 3 to 7, first to fifth units in the water treatment system according to the second embodiment of the present invention will be described in more detail.

Figure 3:
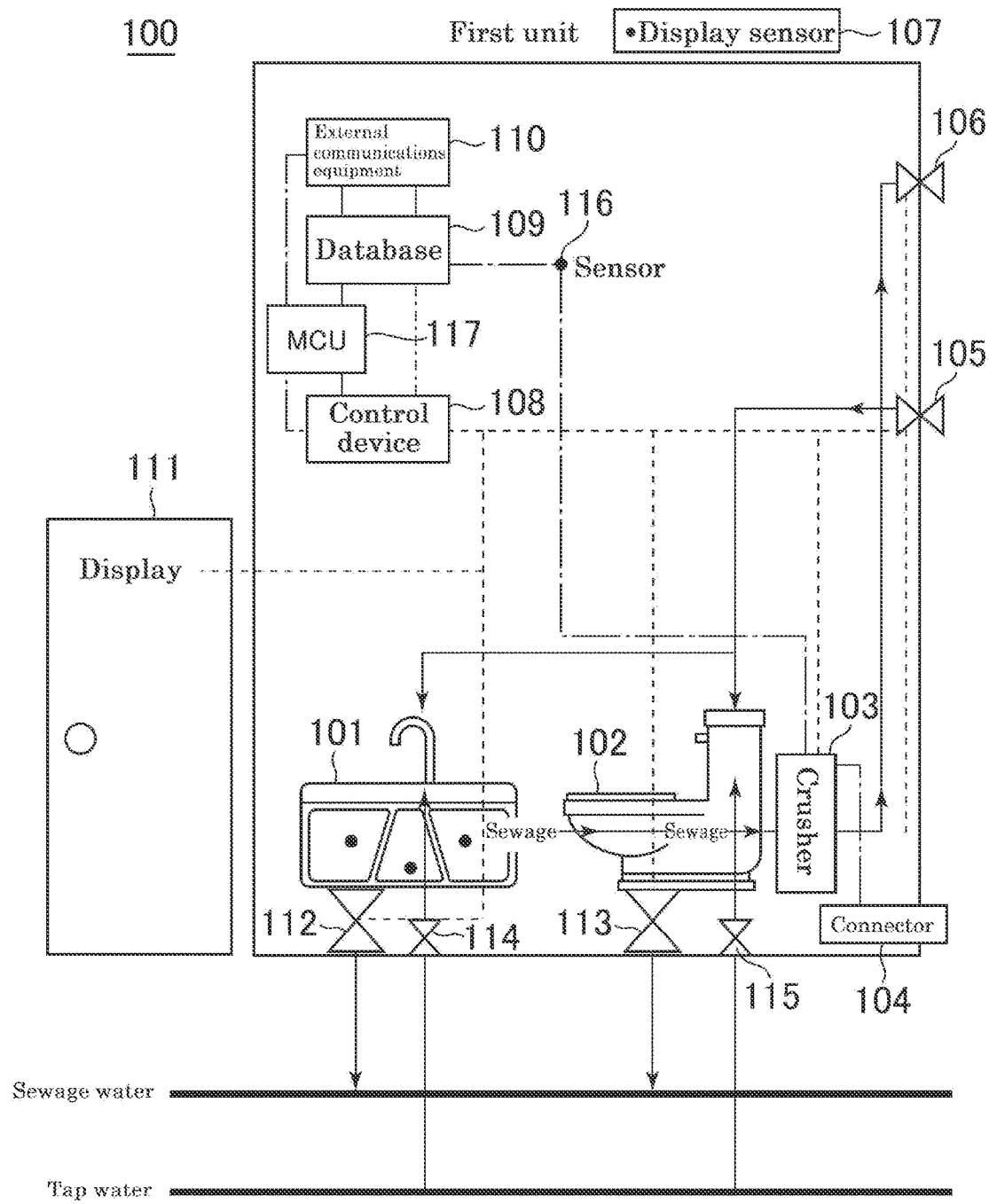
FIG. 3 is a detailed block diagram of a first unit.

FIG. 3 illustrates and describes the configuration of the first unit.

As illustrated in the figure, the first unit 100 represents a location, a container, a mount, or a range that installs and stores a generation source of dirty water such as overall domestic drainage water and toilet sewage water. The overall domestic drainage water other than toilet water is normally discharged from sinks with the infrastructure built, and then discharged into an infrastructure sewerage system via a grease trap or other filters, if any. This configuration also applies to collective housing including large-scale purification tanks with no infrastructure system. The first unit 100 conceptually takes into account such existing toilets and restrooms. The first unit 100 may divide the space into a toilet, a restroom, a kitchen, and showers according to a generation source of water, or may be a room incorporated into a building.

In this example, the first unit 100 includes a restroom 101, a toilet 102, a crusher 103, a connector 104, valves 105, 106, a display sensor 107, a control device 108, a database 109, an external communications equipment 110, an MCU 117 and an output device 111. The restroom 101 and the toilet 102 are also connected to the tap water system and the sewerage system.

The crusher 103 crushes sewage water mixed with paper from the toilet 102 and other facilities and drainage water mixed with pieces of food from domestic drainage water, and may be incorporated into the toilet 102 and the restroom 101. Alternatively, the crusher 103 may be incorporated into the second unit 200, or a single crusher may be installed between the first unit 100 and the second unit 200. The crusher 103 includes a pressure feeding device of sewage water containing crushed solids, or additionally a pressure pump to discharge water. A display 111 visualizes a notification to a user and generates its sound source.

The first unit 100 represents an element, a location, or a range such as a building, a room, or a box- or pallet-like mount regardless of shape, a vehicle, and a case, having a connection port capable of external connection at portions that externally face such as a wall of the element, for drainage water, sewage water, tap water, electricity, communications therefrom. A unit is readily connected with other units via the valves 105, 106, and the connector 104 under predetermined standards, and a water-permeable connection port is preferably configured to cause no backflow or leakage when disconnected or connected.

For electricity and communications, the connector 104 is water-proof or explosion-proof, and easy connection type such as plug construction is preferable. In a water treatment system that is normally connected to the infrastructure, valves 112, 113 provided so as to control the system manually, electrically, pneumatically or hydraulically, regardless of the type of drive, can be operated to stop the drainage water before flowing domestic drainage water and toilet sewage water into the sewerage system as needed. Likewise, valves 114, 115 control the tap water flow.

In cases where drainage water is not flown into the infrastructure sewerage system, the valves 112, 113 provided in the first unit 100 between a generation source of domestic drainage water and toilet sewage water and the sewerage system can be closed to discharge the sewage water into the crusher 103 and discharge the sewage water and drainage water into a sewage water outlet via the valve 106 by controlling the pump. Meanwhile, clean water can be used if the infrastructure functions, and if not, water can be supplied from a tap water inlet via the valve 105. In this case, the second unit 200 or the third unit 300 can be connected to the first unit 100 to set water quality conditions and prepare equipment, both required for water supply and drainage.

Figure 4:
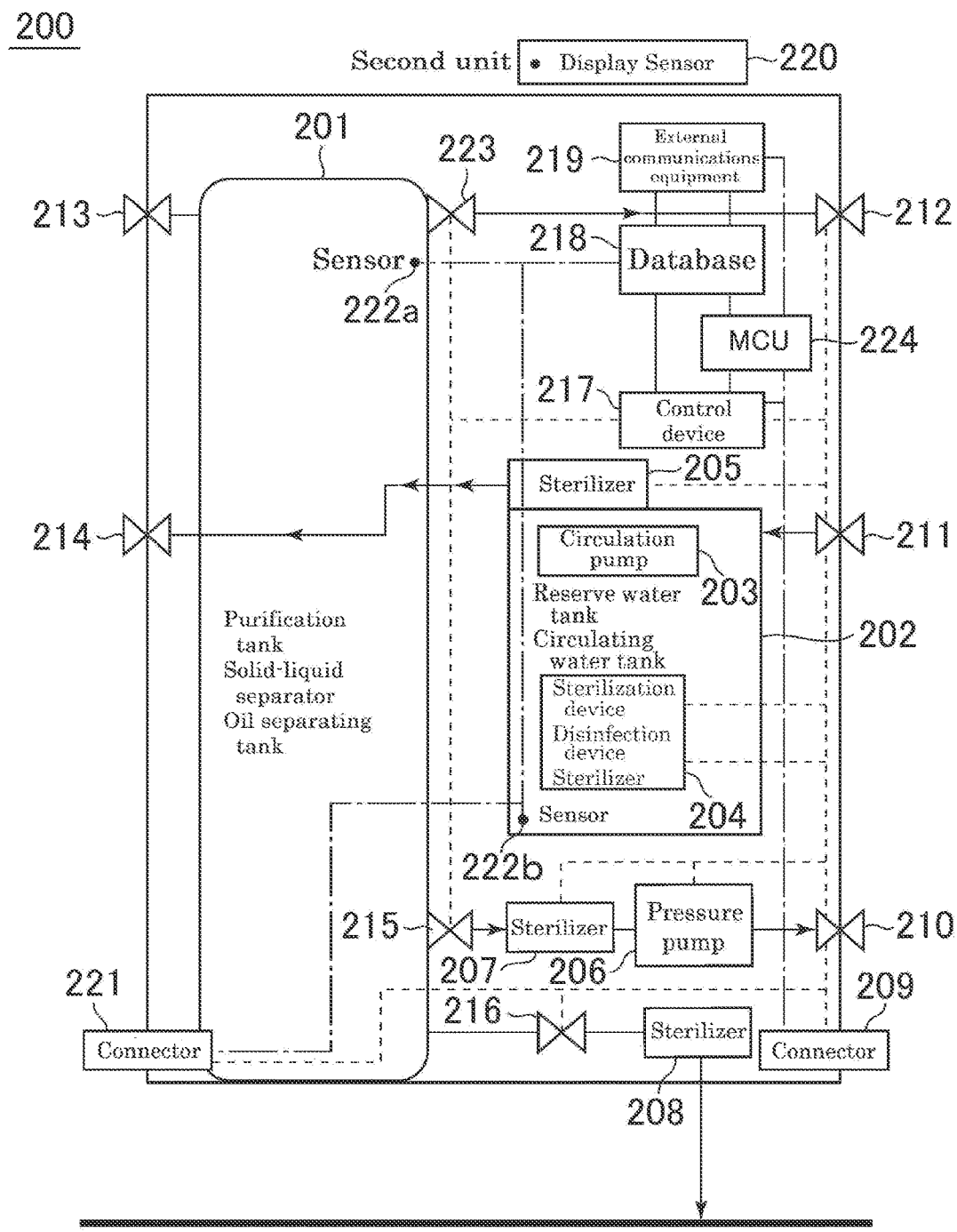
FIG. 4 is a detailed block diagram of a second unit.

FIG. 4 illustrates and describes the configuration of the second unit.

As illustrated in the figure, the second unit 200 includes a purification tank, a solid-liquid separation tank, an oil separation tank 201, a reserve water tank, a circulating water tank 202, a circulation pump 203, a sterilization device, a disinfection device, a sterilizer 204, a sterilizer 205, a pressure pump 206, a sterilizer 207, a sterilizer 208, a connector 209, valves 210 to 216, and 223, a control device 217, a database 218, an external communications equipment 219, an MCU 224, sensors 222a and 222b, and a display sensor 220.

The second unit 200 includes any or combinations of, regardless of anaerobic aeration or aerobic aeration, the purification tank intended to purify water, the solid-liquid separation tank intended to separate solids from liquids, the oil separation tank 201 intended to separate oil and a treatment device, in order to conduct a primary treatment of received sewage water. In the treatment device, required means such as water treatment, sludge treatment, and impurity treatment can be employed in a unit in an unspecified manner.

The second unit 200 includes the reserve water tank and the circulating water tank 202 to which the circulation pump 203 is connected and the sterilization device, the disinfection device, the sterilizer 204 are further connected to keep clean the water in the reserve water tank, the circulating water tank 202, and disinfects the water via the sterilizer 205 in an intended manner, e.g., by chlorine as needed before feeding it to a tap water inlet. The control device 217 determines whether the water is disinfected or not, based on thresholds using the information from the sensors to control the system.

In the water treatment partially using biological treatment, drainage water and sewage water are constantly fed into the purification tank, the solid-liquid separation tank, the oil separation tank 201, and the status is monitored by the sensors to prepare the optimal environment for biological treatment. Accordingly, to connect the second unit to the third unit 300 for an immediate recycling request, the duration for activating microorganisms of the biological treatment can be shortened and the extent of the activation can be reduced.

In normal use, an example purification tank is usually used to discharge treated water into the sewerage system via the sterilizer 208 using a drainage outlet, or to flow into an infiltration inlet, or to flow to rivers, or to perform underground infiltration treatment. When such a purification tank is conveyed and temporarily installed, the drainage outlet is normally closed by the valve 216, and the pressure pump 206 can be used to pressure feed sewage water and drainage water to a remote drainage measure. The method for installing the channels, whether buried or installed overhead, between the devices and their materials can be selected in an unspecified manner as needed, and proper means can be selected, regardless of temporary or permanent, as needed.

Tap water is sent from the tap water system to the reserve water tank, the circulating water tank 202 and is stored therein, is sterilized and disinfected by the sterilization device, the disinfection device, the sterilizer 204, further is disinfected by the sterilizer 205 as needed, and is supplied to the tap water inlet. Stored water is used when the water supply system fails to function, and a countermeasure against the stop of water supply is to connect the third unit 300 and the fourth unit 400 to the second unit 200 as needed to recycle drainage water.

When the infrastructure of tap water and sewerage systems fails to function, or the systems are not used, the third unit 300 is connected to the second unit 200 for recycling the water. A required volume of water is initially fed to the unit. When the fourth unit 400 is connected based on the information from the sensors, the water is supplied from the fourth unit 400 or brought from the exterior to allow the third unit 300 to treat the water so as to have required water quality to use the water as circulating water. For an excess of water, the water treated as tap water can be sprinkled, or the water treated by an extra sprinkler or transpiration device can be discharged into the exterior, whose method is not specified.

Figure 5:
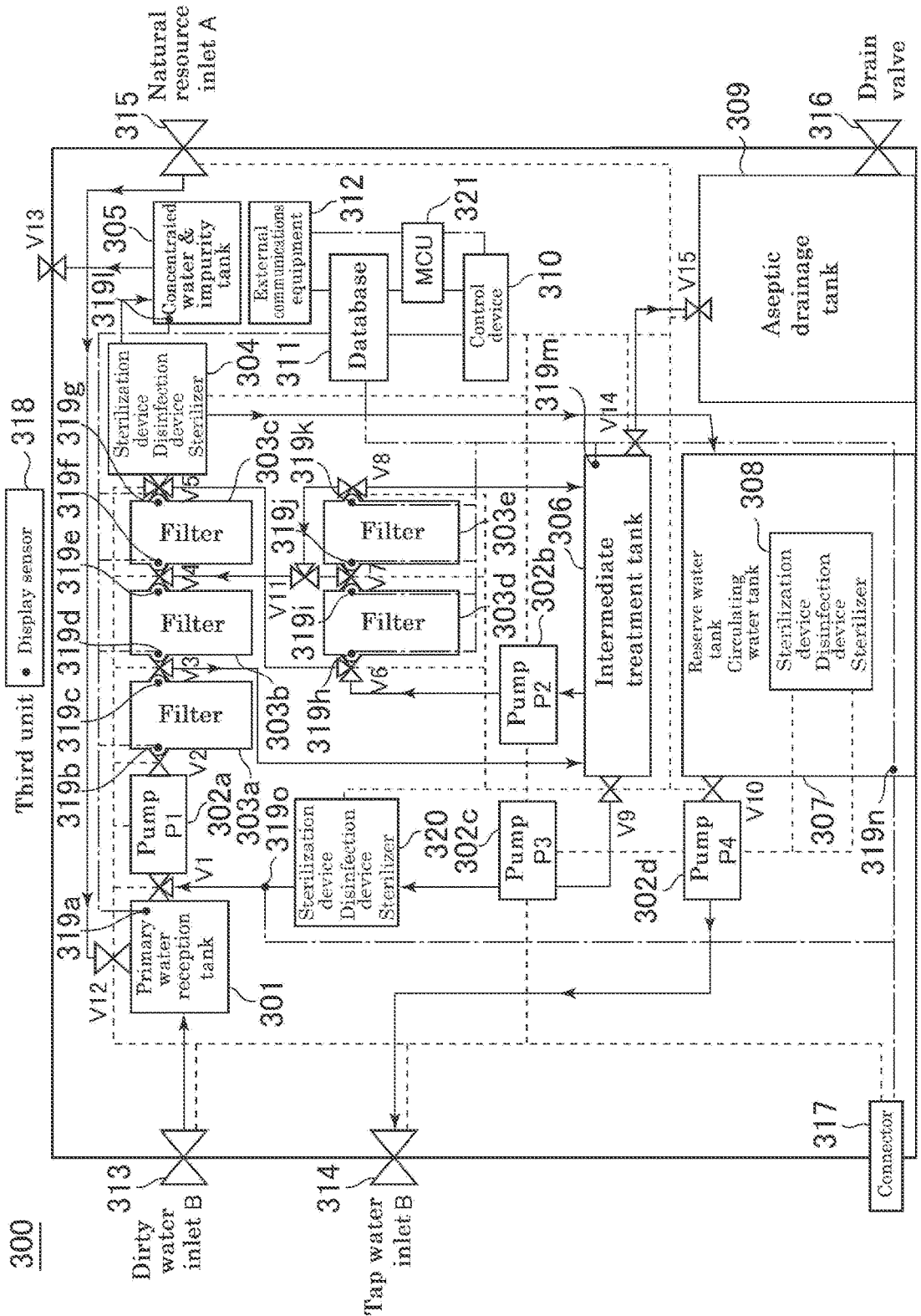
FIG. 5 is a detailed block diagram of a third unit.

FIG. 5 illustrates and describes the configuration of the third unit.

As illustrated in the figure, the third unit 300 includes a primary reception tank 301, pumps 302a to 302d, filters 303a to 303e, a sterilization device, a disinfection device, a sterilizer 304, a concentrated water and impurity tank 305, an intermediate treatment tank 306, a reserve water tank, a circulating water tank 307, a sterilization device, a disinfection device, a sterilizer 308, an aseptic drainage tank 309, a control device 310, a database 311, an external communications equipment 312, an MCU 321, valves 313 to 316, a connector 317, a display sensor 318, valves V1 to V15, sensors 319a to 319o, and a sterilization device, a disinfection device, a sterilizer 320.

Specifically, the third unit 300 is a device, having a sewage water inlet, including the primary reception tank 301, the intermediate treatment tank 306, the reserve treatment tank, the circulation treatment tank 307, the concentrated water and impurity tank 305, the aseptic drainage tank 309, and the valves 313 to 316, V1 to V15, the pumps 302a to 302d, the sterilization devices, the disinfection devices, the sterilizers 304, 308, 320 for setting thresholds and controlling the system by the control device 310 based on sensor data from the sensors 319a to 319o.

The sensors 319b to 319k can be mounted at the inlet and outlet of the filters 303a to 303e for water treatment as needed, and control valves can be combined in one, two, three or four directions as needed, and air vent valves can be provided in the channels. The sensors 319a to 319o provide all the information, including water quality, volume of water, environmental measurement, sensor position, users, date and time of operation, for example, and as needed, they can partially select such information like the volume of water only.

The database 311 can receive data from the sensors 319a to 319o and store the same. The control device 310, by referring to the database 311 and using thresholds, can control the valves 313 to 316, V1 to V15, the pumps 302a to 302d, the sterilization devices, the disinfection devices, the sterilizers 304, 308, 320, and all other devices operated based on electronic control that can be attached to the unit itself.

The data of the database 311 can be output from the external communications equipment 312 to an external device, the output data can also be saved, and data can be output either in wired or wireless manner. The data can also be written in a memory medium such as USB. The database 311 and the control device 310 can be controlled via the external communications equipment 312 from the exterior. For example, required notifications, such as changing thresholds and rewriting control algorithms, can be given in a required way, based on thresholds set in the database 311 from the external device or the external communications equipment 312. Such notifications may be given by e-mail or telephone, for example.

The sewage water flowing from a sewage inlet goes to the primary reception tank 301. The primary reception tank 301 is required to regulate the volume of water, water pressure and water quality in the following filtering according to the volume of received sewage water, in particular, to regulate the volume of water that is sent for the following treatments. At the sensor 319a of the primary reception tank 301, a set water level is sensed to operate the pump 302a and feed the water to the filter 303a via the valve V2. At this time, at the sensors 319a, 319b, 319c mounted on the primary reception tank 301 or the filter 303a1, the water quality is sensed to feed the water to the filter 303b via the three-way valve V3 when the feeding it to the filter 303b is judged to be appropriate. At this time, the three-way valve V3 is closed on the side of the intermediate treatment tank 306 and opened on the side of the filter 303b. When the feeding it to the filter 303b is judged to be inappropriate, the three-way valve V3 is opened on the side of the intermediate treatment tank 306 and closed on the side of the filter 303b to feed treated water to the intermediate treatment tank 306.

The treated water received in the intermediate treatment tank 306 is sensed at the sensor 319m to operate the pump 302b and feed the treated water to the filter 303d via the three-way valve V6. At this time, the three-way valve V6 is opened on the side of the pump 302b and the filter 303d and closed on the side of the three-way valve V5 to sense the water quality at the sensors 319h, 319i installed at the filter 303d and feed the water to the filter 303c via the three-way valves V7, V11, V4 when the feeding the water to the filter 303c is judged to be appropriate. At this time, the three-way valve V7 is closed on the side of the filter 303e and opened on the side of the three-way valve V11, the three-way valve V11 is opened on the side of the three-way valve V7 and the three-way valve V4 and closed on the inlet side of the three-way valve V8, and the three-way valve V4 is closed on the side of the filter 303b and opened on the side of the three-way valve V4 and the filter 303c to feed the water to the filter 303c.

The control device 310 feeds the water to the filter 303e via the three-way valve V7 when the feeding the water to the filter 303e is judged to be appropriate. At this time, the three-way valve V7 is closed on the side of the three-way valve V11 and opened on the side of the filter 303e to feed the water to the filter 5303e. The treated water passing through the filter 303e is fed to the filter 303c via the three-way valves V8, V11, V4. At this time, the three-way valve V8 is closed on the side of the intermediate treatment tank 306, the three-way valve V11 is closed on the side of the three-way valve V7 and opened on the side of the three-way valve V4, and the three-way valve V4 is closed on the side of the filter 303b and opened on the side of the filter 303c to feed the water.

The sewage water treated in each of the filters 303a to 303e passes through the filter 303c, and purified water passes through at least any of the sterilization device, the disinfection device and the sterilizer 308 to the reserve water tank, the circulating water tank 307 to feed the water. At this time, concentrated sewage water and impurities and treated water are separated. For example, RO membrane treatment may be used. Separated concentrated sewage water and impurities pass through at least any of the sterilization device, the disinfection device and the sterilizer 308 to be sterilized and stored in the concentrated water and impurity tank 305. The reserve tank 305 includes a connection port with no liquid leakage to remove stored concentrated sewage water and impurities, and they can be taken to the exterior for treatment or discharged into the exterior via the valve V13 as needed. The discharged substances are sterilized, disinfected and antisepticized.

The number of combinations of the treatment of the above sewage water is not restricted as needed, and the number and duration of valve control and the volume of water to be fed are not restricted. The types of materials of the filters 303a to 303e are not restricted, and as needed, they may be selected from resins, natural materials, membrane-treated materials, activated carbon, ion-adsorption materials and others accordingly.

During filter replacement or channel maintenance, channels are subjected to sewage water treatment, possibly leading to contamination by various bacteria and viruses. During filter replacement, there is a possibility to leak bacteria and viruses to the exterior if channels including filters are not asepticized. To prevent such a drawback during channel maintenance, at least any of the pumps 302a, 302c, the filters 303a to 303e, the valves V1 to V11, the sterilization devices, the disinfection devices, and the sterilizers 304, 308, 320 can be controlled to sterilize, disinfect and antisepticize the channels.

During channel disinfection, the intermediate treatment tank 306 is used to circulate the water via the sterilization device, the disinfection device, the sterilizer 320, and to antisepticize the water, and to sterilize and disinfect the channels and filters by mixing the water with a chemical effective for sterilization, disinfection and antisepticization such as chlorine. The circulating water in the disinfected channels is fed to the aseptic drainage tank 309 via the valve V15 by opening the valve V14. After feeding the water, the valve V15 is closed to prevent volatilization of drainage water mixed with chlorine or other effective chemicals and external contamination. The aseptic drainage tank 309 may discharge water to the exterior via the drain valve 316, or may convey the tank to the exterior by introducing a leak-proof coupler on the valve V15.

The pump 302c is used to sterilize, disinfect and antisepticize the channels, and the three-way valve V1 is closed on the side of the primary reception tank 301 and opened in the other 2 directions, the three-way valve V3 is closed on the side of the intermediate treatment tank 306 and opened in the other 2 directions, the three-way valve V4 is closed on the side of the three-way valve V11 and opened in the other 2 directions, the four-way valve V5 is opened on the side of the filter 303c and the three-way valve V6 and closed on the other side, the three-way valve V6 is closed on the reception side of the pump 302b and opened on the other side, the three-way valve V7 is closed on the side of the three-way valve V11 and opened on the other side, and the three-way valve V8 is closed on the side of the three-way valve V11 and opened on the other side to feed the water to the intermediate treatment tank 306, and sterilize, disinfect and antisepticize the circulating water.

The water passes through at least any of the sterilization device, the disinfection device, and the sterilizer 320 from the intermediate treatment tank 306 via the valve V9 by operating the pump 302c and will be fed to the pump 302a. The pump 302a may have a bypass function, or may be operated to feed the circulating water. Circulating treated water is sensed by the sensor 319a, and the aseptic state and aseptic conditions may be set as thresholds to judge them on the side of the control device 310. For example, by mixing the water with chlorine to judge by the chlorine concentration, the aseptic state is confirmed, and asepticized treated water is discharged from the channels.

The filters 303a to 303e in the asepticized channels are replaced, and upon completion of maintenance, impurities and chlorine in the drainage water stored in the aseptic drainage tank 309 may be removed and recycled (or may be treated in the unit 3). Such a third unit 300 can be used as a single water treatment apparatus or water purifier for various types of water resources.

Figure 6:
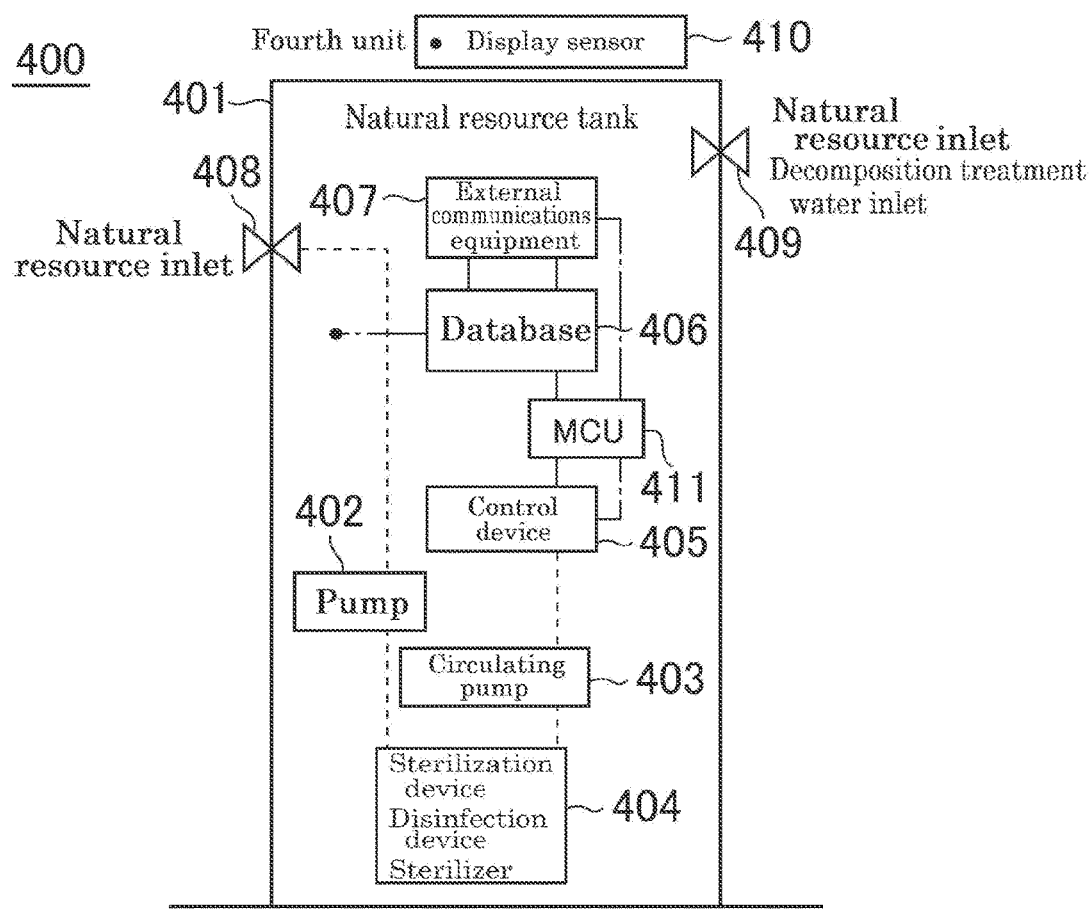
FIG. 6 is a detailed block diagram of a fourth unit.

FIG. 6 illustrates and describes the configuration of the fourth unit.

As illustrated in the figure, the fourth unit 400 itself is a natural resource tank 401, including a pump 402, a circulation pump 403, a sterilization device, a disinfection device, a sterilizer 404, a control device 405, a database 406, an external communications equipment 407, an MCU 411, valves 408, 409, and a display sensor 410.

Accordingly, the fourth unit 400, including the natural resource tank 401, removes impurities and keeps sterile the water quality in the tank by circulating the water via at least any of the sterilization device, the disinfection device, and the sterilizer 404, using the circulation pump 403 in order to receive natural resources, rain water, river water, and in some cases seawater and prevent received water from going rotten. The sensor 411 provided in the fourth unit 400 can sense the water quality, the volume of water, chlorine concentration used for disinfection, and concentration of chemicals, and manage the system on the side of the control device 405 by setting thresholds for the water quality in the tanks, and further regulate the volume of water for water reception and supply.

Figure 7:
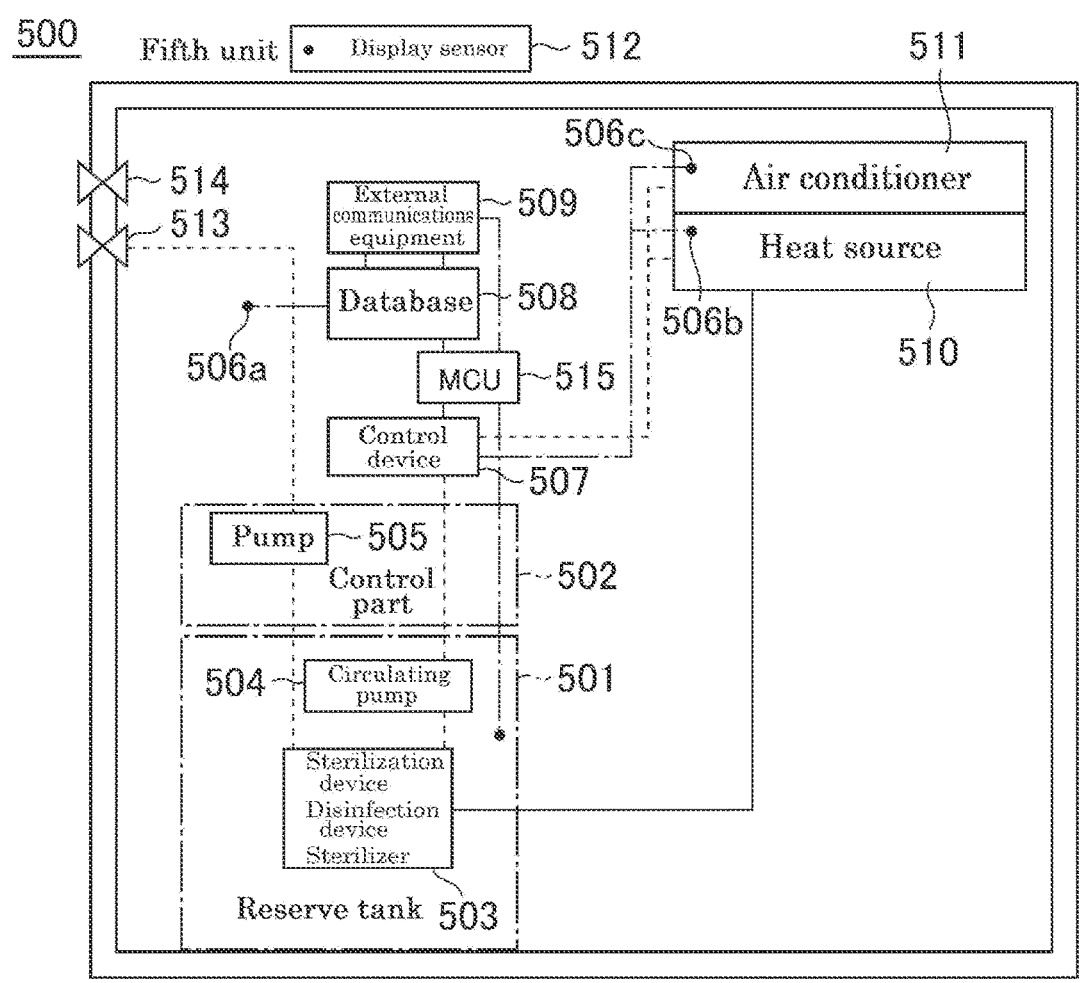
FIG. 7 is a detailed block diagram of a fifth unit.

FIG. 7 illustrates and describes the configuration of the fifth unit.

As illustrated in the figure, the fifth unit 500 includes a reserve water tank 501, a treatment portion 502, a sterilization device, a disinfection device, a sterilizer 503, a circulation pump 504, a pump 505, sensors 506a to 506c, a control device 507, a database 508, an external communications equipment 509, an MCU 515, a heat source 510, an air conditioner 511, a display sensor 512, and valves 513, 514.

The fifth unit 500 is a device intended to further decompose and treat concentrated sewage water and impurities generated in the third unit 300. In the water recycling in the first unit 100, the second unit 200, the third unit 300, and the fourth unit 400, the treatment capacity and rate are essentially set so long as the total volume of used water is limited, and concentrated sewage water and impurities may require a long period of treatment time during ozone treatment, electrolysis, or biological treatment. Likewise, using no power but osmotic force for filtering, the infiltration rate varies depending on its filtering material.

Therefore, a required treatment is performed in the first unit 100, the second unit 200, the third unit 300, and the fourth unit 400, and the device intended to individually perform long and slow treatment of concentrated sewage water and impurities corresponds to the fifth unit 500. The water treatment method by the fifth unit 500 can optionally select from any materials of natural material filters, resin filters, soil, sand, stones, infiltration filters, ozone, photocatalysts, chemical addition, and electrolysis, without restriction as needed, and whether the power required for treatment is necessary or not is not specified.

The treatment portion 502 in the fifth unit 500 may have the same configuration and requirements as in the third unit 300. The number and size of the devices in the unit can optionally be determined as needed. The fifth unit 500 can be connected to the third unit 300 and the fourth unit 400 as needed. Additionally, an excess of water generated can be treated by conveying, sprinkling, transpiring, tank storing and so on.

The control based on sensor data in the first to fifth units will comprehensively be described in more detail.

Sensors provided at each of the units output the information including at least any of water quality, volume of water, environmental measurement, sensor position, users, date and time of operation, and electricity consumption, and can select such information like the volume of water only as needed. A database provided at each of the units stores data from each sensor. A control device, by referring to the database, can control valves, pumps, a display, a sterilization device, a disinfection device, a sterilizer, and all other devices operated based on electronic control that can be attached to the units, using set thresholds, for example. The sensors are connected to the database in either wired or wireless manner. Data can be written in USB or other memories as needed. The data stored in the database can be output to the exterior via an external communications equipment either in wired or wireless manner. The database and the control device can remotely be controlled via the external communications equipment from an external device.

The database and the control device, and the control device and apparatuses to be controlled may be connected either in wired or wireless manner. Required notifications can be given in a required manner, based on thresholds set in the database from the external device or the external communications equipment. The methods for giving such notifications may include, for example, e-mail, telephone, display on a terminal having wires or having a radio wave communication function, but are not restricted thereto.

In the first unit 100, the control device, based on sensor data, manages communications wave state, wired communications state, failure, the number of users, date and time of use, duration for use, operating time of devices, air temperature and humidity, atmospheric pressure, electricity consumption, number of use of dirty water generation sources, number of use of crusher, volume of used water, water quality, water temperature, water pressure, number of bacteria, number of viruses, radioactive contamination degree, and content.

In the second unit 200, the control device, based on sensor data, manages communications wave state, wired communications state, failure, and in the purification tank solid-liquid separation tank, the oil separation tank, date and time, operating time of devices, air temperature and humidity, atmospheric pressure, electricity consumption, volume of received dirty water, volume of supplied water, water quality, water temperature, water pressure, microorganism state, and in the reserve water tank, the circulating water tank, date and time, operating time of devices, air temperature and humidity, atmospheric pressure, electricity consumption, volume of received dirty water, volume of supplied water, water quality, water temperature, water pressure, number of bacteria, number of viruses, radioactive contamination degree, and content.

In the third unit 300, the control device, based on sensor data, manages communications wave state, wired communications state, failure, date and time, operating time of devices, air temperature and humidity, atmospheric pressure, electricity consumption, volume of received dirty water, volume of supplied water, water quality, water temperature, water pressure, number of bacteria, number of viruses, and radioactive contamination degree, and in the tanks installed, date and time, operating time of devices, air temperature and humidity, atmospheric pressure, electricity consumption, volume of received dirty water, volume of supplied water, water quality, water temperature, water pressure, number of bacteria, number of viruses, radioactive contamination degree, content, and concentration of chemicals.

In the fourth unit 400, the control device, based on sensor data, manages communications wave state, wired communications state, failure, date and time, operating time of devices, air temperature and humidity, atmospheric pressure, electricity consumption, volume of received dirty water, volume of supplied water, water quality, water temperature, water pressure, number of bacteria, number of viruses, and radioactive contamination degree, and in the tanks installed, date and time, operating time of devices, air temperature and humidity, atmospheric pressure, electricity consumption, volume of received dirty water, volume of supplied water, water quality, water temperature, water pressure, number of bacteria, number of viruses, radioactive contamination degree, content, and concentration of chemicals.

In the fifth unit 500, the control device, based on sensor data, manages communications wave state, wired communications state, failure, date and time, operating time of devices, air temperature and humidity, atmospheric pressure, electricity consumption, volume of received dirty water, volume of supplied water, water quality, water temperature, water pressure, number of bacteria, number of viruses, and radioactive contamination degree, filtering material humidity, and in the tanks installed, date and time, operating time of devices, air temperature and humidity, atmospheric pressure, electricity consumption, volume of received dirty water, volume of supplied water, water quality, water temperature, water pressure, number of bacteria, number of viruses, radioactive contamination degree, content, and concentration of chemicals.

Thus, based on data transmitted from each of the units and sensors, the control device can control the operating state of connected units or single unit, expected maintenance periods, failure, insufficient water volume, and abnormal water quality, and so on. Information storage and analysis can obviously achieve planning of the design of more optimal channels and selection of water volume, pressure, and the number, treatment volume and rate, and treatment precision of apparatuses used and filters.

In each of the units, including their connecting portions, the control device can control required environment based on sensor data using thresholds set in the database, and regulate the air temperature, humidity, and water temperature in the units. Specifically, based on sensor data, the control device can control the required environment using thresholds set in the database, provide outline of each unit, locations for accommodating each device, the control device and database, etc., and channels with a thermal or insulating property, which can optionally select and install an element including a warming/cooling mechanism incorporated into a material itself in advance or later without restriction. The method for regulating the temperature of a warming/cooling heat source may be to install heating wires, air conditioners, boilers, oil heaters, water temperature coolers, ventilators and any other means. This advantage also applies to each unit, device, connecting portion, and channel. Installation locations are adapted to the outline of the units, apparatuses in each of the units, and all the channels.

The above-described biological treatment requires oxygen supply. In some cases, odor, toxic gas, and flammable gas may be generated, but each unit may be prone to undesired air stagnation and other drawbacks according to the operating state and the environment in installation locations. To overcome the problems of such odor, gas generation, adhesion of bacteria, viruses and mold, and air stagnation, each unit allows the control device to control air intake, air discharge, and agitation, based on sensor data. Each unit is operated manually or electrically without restriction.

Subsequently, the advantage of various combinations of the first to fifth units will be described.

The third unit 300 can be connected to the first unit 100 such as restrooms or showers when food or solids are not mixed with water of the first unit 100 or when biological treatment is not necessary. In this case, the second unit 200 may be connected between the first unit 100 and the third unit 300. When biological treatment is not performed, the first unit 100 and the third unit 300 can be combined as a pair, and their sizes and scales can optionally be determined according to the volume and quality of water to be treated. The mechanism of the third unit 300 for sterilizing, disinfecting and antisepticizing water in the channels can be used to prevent contamination by bacteria or viruses and transport, convey and mount on vehicles the system by unit.

The second unit 200 or the third unit 300 can be connected to the first unit 100 in series in accordance with a dirty water generation source therein. The parallel connection of the second unit 200 and the third unit 300, each provided with the same function, depending on the scale and as needed, can regulate the scale of the capacity. The second unit 200 and the third unit 300 can be followed by the fourth unit 400 and the fifth unit 500 connected thereto in series as needed. Further as needed, the parallel connection of the fourth unit 400 and the fifth unit 500 can regulate the scale of the capacity.

(Water Recycle as Needed)

In the treatment of drainage water and sewage water containing organic substances in large quantities such as kitchen domestic drainage water and toilet water using biological treatment and biofiltration, a purification tank, a solid-liquid separation tank, an oil separation tank can also be installed in the same unit as the dirty water generation source. In this case, the first unit 100 and the second unit 200 may be integrated as a pair.

The water treatment system, which is already connected by the infrastructure tap water and sewerage systems and operated, can be provided with a controllable valve between an infrastructure and a generation source corresponding to the first unit 100, manually or electrically, to switchably connect to the second unit 200 as needed. In this case, a new connection allows treated sewage water to flow into the system, resulting in longer activation for biological treatment. Then, the purification tank in the second unit 200 can optionally be subjected to required means such as exposure to ozone and electrolysis.

(Drainage Water Treatment from Dirty Water Generation Source Containing Solids)

In drainage water treatment from a dirty water generation source containing solids, the first unit 100 discharges organic substances, oil, and solids from the kitchen, and contaminants, paper, and urine from the toilet. Sewage water is fed to the purification tank, the solid-liquid separation tank, the oil separation tank 201 in the second unit 200 via the crusher 103 in the first unit 100 to be treated as needed. The treated sewage water is subsequently fed to the third unit 300 to allow the control device 310 in the third unit 300 to treat the sewage water while switching the channels and selecting the filters by judging an appropriate treatment according to the water quality, using thresholds set based on the information from the sensors.

(Drainage Water Treatment from Dirty Water Generation Source Containing No Solids)

In the treatment of drainage water from a dirty water generation source containing no solids, the first unit 100 discharges water containing solids or relatively less organic substances or impurities from restrooms, showers, and washing. When biological treatment is not required, the first unit 100 can be connected to the third unit 300. At this time, the second unit 200 may be interposed between the two units. Sewage water is fed to the third unit 300 via a crusher having a water pressure feeding function or via a pump to allow the control device 310 to treat the sewage water while switching the channels and selecting the filters by judging an appropriate treatment according to the water quality, using thresholds set based on the information from the sensors.

Herein, various combinations of connecting the first to fifth units will be further described.

Figure 8:
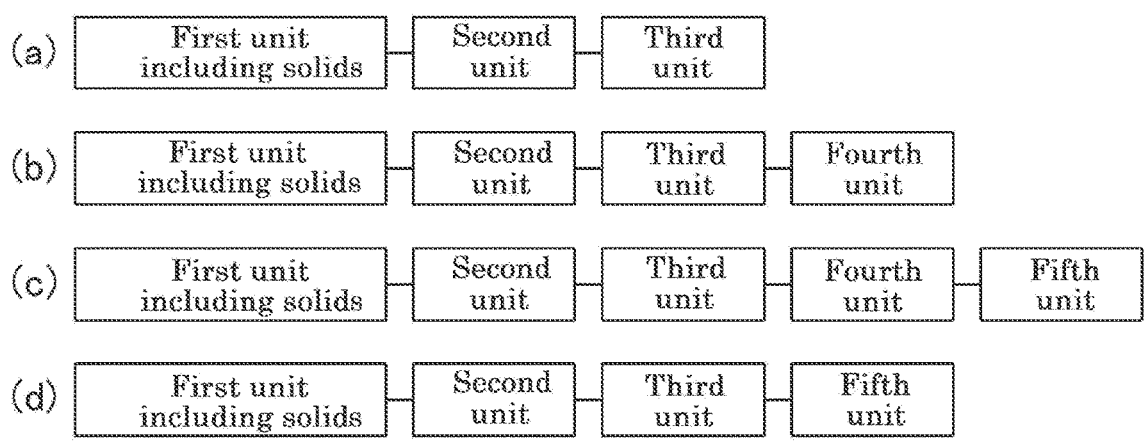
FIG. 8 is a diagram illustrating a variant of a connecting pattern of each of the units.
Figure 9:
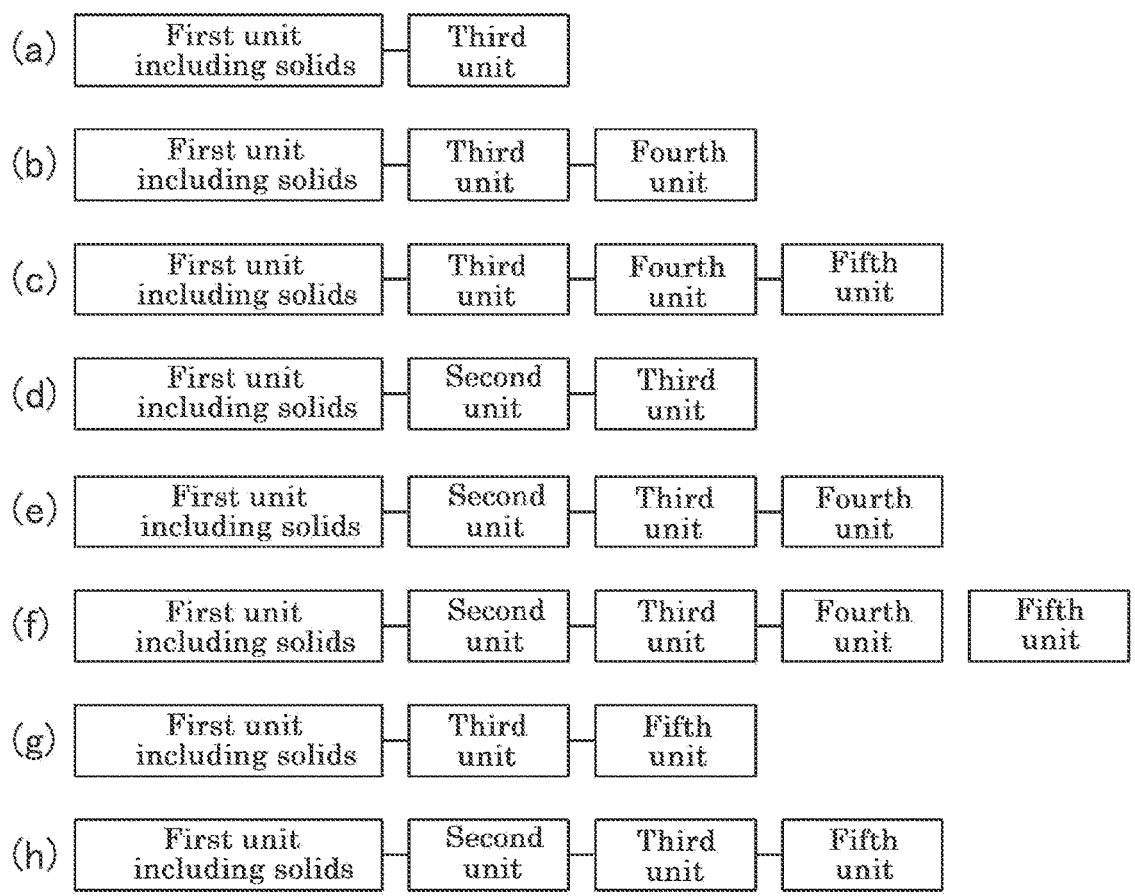
FIG. 9 is a diagram illustrating a variant of a connecting pattern of each of the units.
Figure 10:
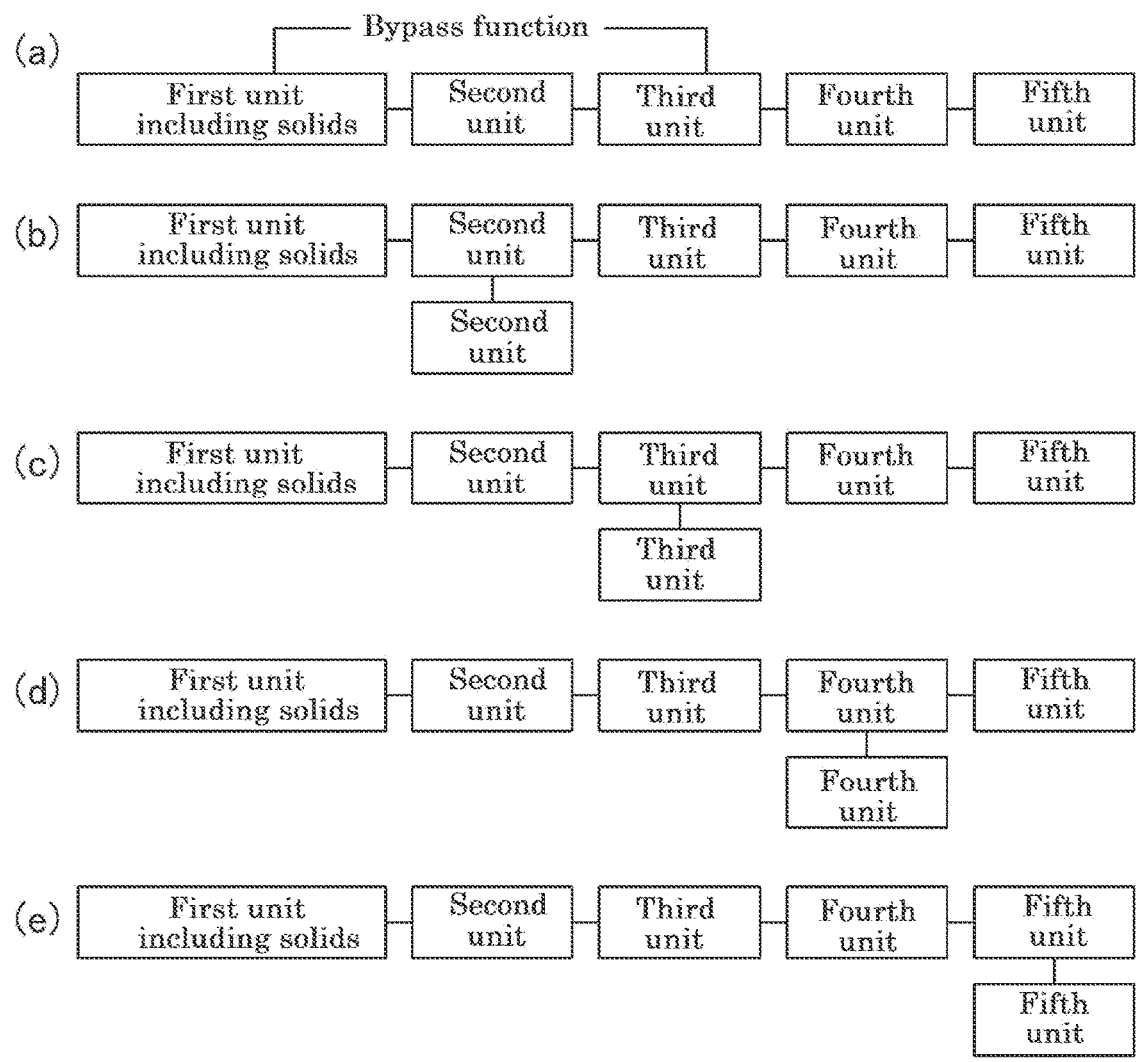
FIG. 10 is a diagram illustrating a variant of a connecting pattern of each of the units.
Figure 11:
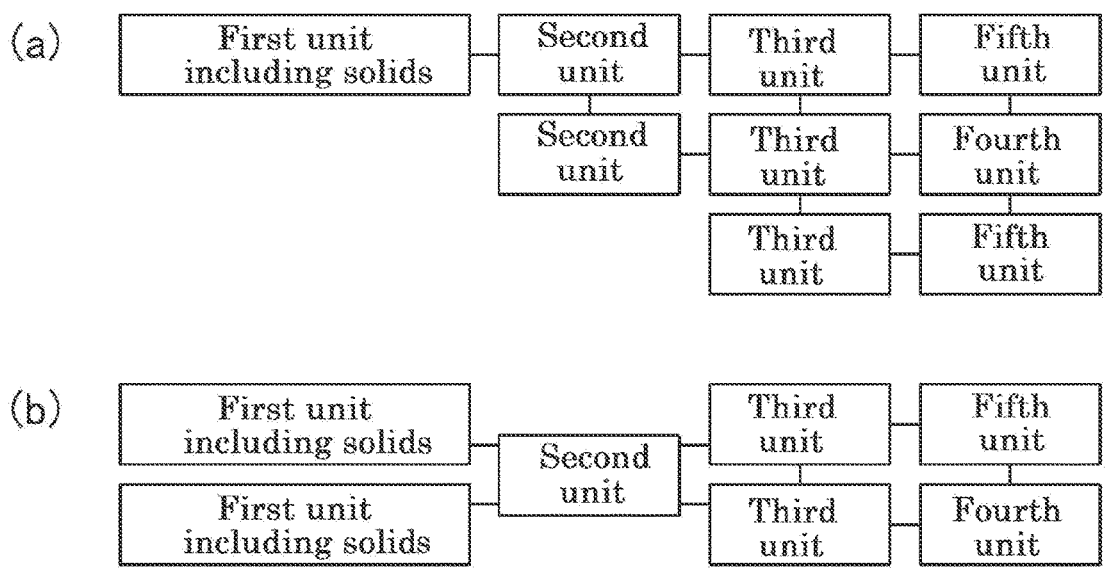
FIG. 11 is a diagram illustrating a variant of a connecting pattern of each of the units.

The water treatment system according to the second embodiment of the present invention can allow for series connection as shown in FIGS. 8 (a) to (d), series connection as shown in FIGS. 9 (a) to (h), parallel connection as shown in FIGS. 10 (a) to (e), and parallel connection as shown in FIGS. 11 (a) and (b).

(Series Connection)

The second unit 200 and the third unit 300 can be connected in series in accordance with a dirty water generation source in the first unit 100. The second unit 200 and the third unit 300 can be followed by the fourth unit 400 and the fifth unit 500 connected thereto in series as necessary. The parallel connection introduced as needed can regulate the scale of capacity. In some cases, biological treatment in the second unit 200 may be performed in combinations of series connection and repeated identical treatment as needed.

As an example of the first unit 100 including solids, the second unit 200, the third unit 300, the fourth unit 400, and the fifth unit 500 are designed according to the volume of water for the first unit and expected dirty water quality, and are connected in series to treat dirty water and recycle the water, and when circulating water is in short supply, water is supplemented from the fourth unit 400, and concentrated water and impurities generated in the water treatment may be treated in the fifth unit 500. All the units are controlled based on sensor data from sensors mounted on the units.

For example, the reception state, treatment rate, and elements required for the treatment in the second unit 200 are monitored for the water quality and the volume of dirty water generated in the first unit 100 to control the system in the environment optimal for biological treatment. Like the second unit 200, the third unit 300 monitors received dirty water quality, water volume, treatment rate, clogging of filters used, the volume of circulating water to control the system. In order to regulate the concentration and water volume for the entire water volume and water quality based on the data from the first unit 100 and the second unit 200 and the third unit 300, the fourth unit 400 supplies water to the first unit 100 and the second unit 200 and the third unit 300 if required, and controls the system so as to receive its shortfall from a natural resource. Not only a natural resource, but also the water transported and carried-in may be received. In order to treat concentrated water and impurities discharged from the third unit 300, the fifth unit 500 monitors received dirty water quality, water volume, treated water quality, water volume, and treatment rate to control the treatment.

The thresholds set for a set of controls are determined for each of the units and controlled based on volumes of dirty water and used water generated in the first unit 100, and its water quality. When a generation source may contain less solids or organic substances and it is thus judged that a second unit 200 is not necessary, a bypass function may be provided for feeding dirty water from the first unit 100 to the third unit 300.

(Parallel Connection)

The parallel connection of the second unit 200 and the third unit 300, each provided with the same function, depending on the scale and as needed according to the dirty water generation source in the first unit 100, can regulate the scale of the capacity. When the water quality and the volume of dirty water generated from the first unit 100 change, e.g., the number of uses increases, the volume of used water increases, the air temperature decreases to reduce biological treatment, or the impurity concentration increases in dirty water, the second unit 200 is connected to the first unit 100 in parallel if the capacity of biological treatment is preferentially added to the system for dirty water generated from the first unit 100. When biological treatment is favorable, but it is judged that there are burdens on other treatment rates and treatment capacities, the third unit 300 is additionally connected to the system in parallel. When a loss of circulating water comes early, the fourth unit 400 is additionally connected to the system in parallel. Even in cases where the volume of concentrated dirty water and impurities generated from the third unit 300 changes, the resulting shortfall causes the fifth unit 500 to be additionally connected to the system in parallel. Instead of being conveyed and installed where needed, the fifth unit 500 can be disposed constantly in parallel and a parallel portion can be used as needed. This configuration can achieve an optimum water treatment system that suitably combines a reasonably required number of and a plurality of units, whether for a short or long period of time, as needed. Also, seasonally-adjusted combinations and removal are easy.

Figure 12:
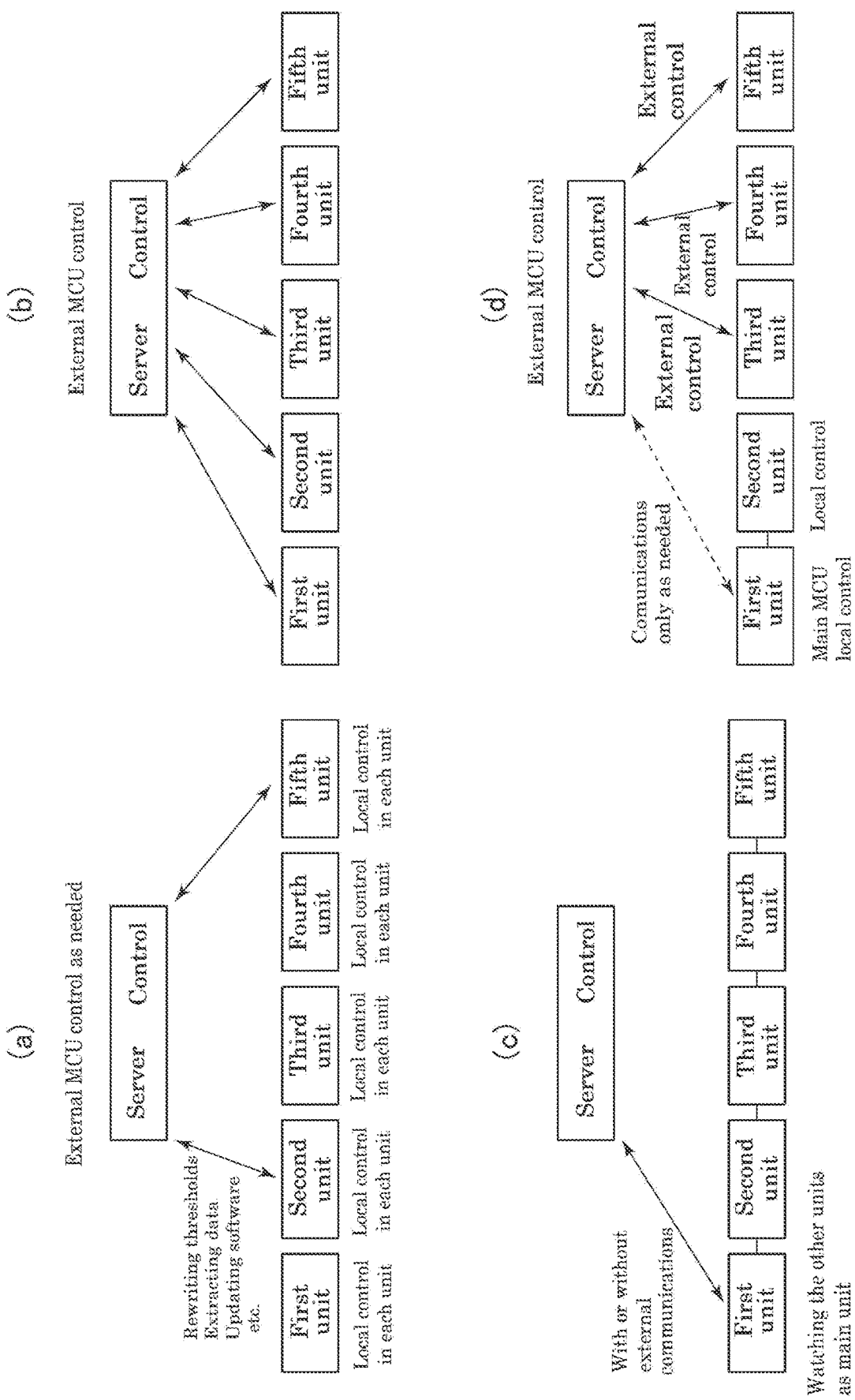
FIG. 12 is a conceptual diagram describing communications and controls between the units.

Subsequently, with reference to FIGS. 12 (a) to (c), communication control in the water treatment system according to the second embodiment of the present invention will be described in detail.

A database in each unit is connected to required sensors and a sensor receiver, and to a control device capable of controlling the system based on sensor data according to increases or decreases in the number of sensors, and to an external communications equipment. The connection method may be either wired or wireless. It is possible to set thresholds for an MCU in each unit and control a control device per unit without external communications. As needed, data from a sensor and other data can be written in recording media. An MCU and a control device in each unit can communicate with an external MCU, whether wired or wireless to the exterior, and can optionally perform required operations such as setting of MCUs in each unit, rewriting and renewal of thresholds, control of a control device in each unit, installation and relocation of MCUs in the exterior, and control of a control device from its MCU.

In a plurality of units connected, a main MCU can be set, and it is possible to integrally process sensor data of all the connected units on MCU data. When an MCU of a database is constantly connected to the exterior and program control and when communications are performed manually, automatically, temporarily or constantly, an MCU in each unit or an MCU for controlling each control device can be installed outside of the unit or on the side of an independent unit or a server. At this time, setting and rewriting of thresholds may not be set by human judgment, but be judged by means of a program prepared based on sensor data. Stored data may be machine-learned for judgment. Updated contents and updated periods may also be judged.

As described above, the embodiments of the present invention can provide the following advantageous effects.

Generally, toilets or restrooms that are connected to the infrastructure can be used without water available from water or other tanks due to disasters or droughts because the water is constantly supplied or discharged. At the time of disaster, rain water or river water can be an emergent water source, and discharged water can be stored to supply water. The use of domestic water or toilets by a large number of unspecified people can cause unidentified external contamination, including infectious diseases, but this problem can be solved by sterilization, disinfection and antisepticization. Even a remote dirty water treatment itself brings about low transportation costs, maintenance costs and management burdens.

Less time is required for activating microorganisms even for biological treatment. In cases where water conservation, effective use of resources, and reduction in burdens on the infrastructure are intended, concentrated dirty water and impurities can readily be discharged to remove foreign matter with a filter. It is easy to separate solids from liquids and remove precipitate referred to as sludge from purification tanks and other tanks. In locations where no sewerage system is prepared, soil osmotic treatment is not necessary, resulting in less contamination burden on the environment. Since the entire device, e.g., channels including filters, can be sterilized, disinfected or antisepticized as needed, maintenance operations cause no external contamination.

During the recycling of drainage water and dirty water, the system can be transported, expanded, and change the volume of water. Specifically, it is possible to select a scale, elements, and a location as needed, and select a required water volume, a scale, elements, and a location per person as needed. It is easy to transport and install the system as needed while utilizing circulating water, and possible to divide required elements for urgent water treatment for only existing equipment to be mounted, installed, and transported. Another advantage is additional combinations of sensors or control devices in use.

Also, the first to fifth units are each provided with an MCU, which acquires sensor data from each of the sensors regardless of the number of the sensors increased or decreased and which transmits the data to a control device, and the MCUs and control devices provided in the first to fifth units are connected to MCUs provided in other units, in either wired or wireless manner to communicate with MCUs in other units or external MCUs to achieve setting of the MCUs in the first to fifth units, rewriting and renewal of thresholds, control of the control devices in the first to fifth units, and data transmission from the MCUs to the control devices. One of the MCUs and one of the control devices in the first to fifth units can be defined as a main MCU and a main control device respectively. The main MCU and main control device perform centralized control of all other MCUs and control devices in the first to fifth units, and the control system can control valves in the first to fifth units and all the devices operated based on electronic control.

The embodiments of the present invention have been described, but the present invention is not restricted thereto, and various modifications and alterations can obviously be made without departing from the spirits.

For example, the connection between the first to fifth units is not restricted to the above-described embodiments, but various combinations thereof can obviously be employed.

REFERENCE SIGNS LIST

1 ... Water treatment system, 2 ... First unit, 3 ... Second unit, 4 ... Third unit, 11 ... Toilet, 12 ... Crusher, 13 ... Purification tank, Solid-liquid separator, 14 ... Circulating water tank, 15 ... Pump, 16 ... Filter devices, 17 ... Intermediate treatment tank, 18 ... Concentrated water and impurity tank, 19 ... Sterilization and disinfection device, 20 ... Sterilization and disinfection device, 21 ... Control device, 22 ... External communications equipment, 23 ... Database, 24a to 24h ... Valve, 25a to 25e ... Sensor, 26 ... Reserve tank, Solid-liquid separator, transpiration device, 2 ... Infiltration inlet, river discharging, transpiration, 50 ... Water treatment system, 100 ... First unit, 200 ... Second unit, 300 ... Third unit, 400 ... Fourth unit, 500 ... Fifth unit.

The invention claimed is:

1. A water treatment system comprising:
a first unit having a generation source of dirty water containing overall domestic drainage water and toilet sewage water;
a second unit fluidly connected to the first unit and having at least any of a purification tank, a solid-liquid separation tank, and an oil separation tank intended to purify water, regardless of anaerobic aeration or aerobic aeration, and conducting a primary treatment of the dirty water received from the first unit; and
a third unit having a dirty-water inlet fluidly connected to the second unit and further having a primary reception tank, an intermediate treatment tank, a reserve water tank, a circulating water tank, a concentrated water and impurity tank, and an aseptic drainage tank, wherein
each of the first to third units includes a sensor and a valve, and is transportable and independent of other units by closing the valves,
the third unit further includes a pump, filter devices, a control device and an external communications equipment, and at least any of a sterilization device, a disinfection device, and a sterilizer,
the control device performs centralized control of at least any of the valve, the pump, the sterilization device, the disinfection device, and the sterilizer, based on sensor data from the sensor of each of the first to third units,
the first to third units include a recycling means to treat and recycle the dirty water in a circulation, and
the recycling means is configured to fluidly connect from the first unit through the purification tank or the solid-liquid separation tank or the oil separation tank in the second unit to the filter devices in the third unit, and to fluidly connect from the filter devices through a circulating water tank in the second unit back to the first unit.

2. The water treatment system according to claim 1, further comprising a fourth unit that includes a natural resource tank and keeps sterile the water quality in the natural resource tank by circulating the water via at least any of a sterilization device, a disinfection device, and a sterilizer, using a circulation pump in order to receive natural resources, rain water, river water, and seawater, remove impurities from received water and prevent the water from going rotten.

3. The water treatment system according to claim 2, further comprising a fifth unit that includes a decomposition treatment device for further decomposing and treating concentrated dirty water and impurities generated in the third unit.

4. The water treatment system according to claim 1, wherein
the first unit is connected to tap water and sewerage systems, and the utilization of the tap water and sewerage systems or the water treatment by the second unit can selectively be switched by opening and closing the valve.

5. The water treatment system according to claim 3, wherein
the second to fifth units can be expanded and reduced according to increases or decreases in water consumption and according to changes in the type of dirty water by series or parallel connection of a plurality thereof, depending on the scale of the first unit, the purpose and the level of water treatment.

6. The water treatment system according to claim 3, wherein
water and electricity to be fed to the first to fifth units can be obtained by utilizing natural resources.

7. The water treatment system according to claim 3, wherein
at least any of the first to fifth units include at least any of a cooling and heating air conditioner, a water temperature adjustment device, a pipe insulating device, and a unit insulation structure, in order to adapt the system to an installation environment.

8. The water treatment system according to claim 3, wherein
the first to fifth units can be transported, conveyed and mounted on vehicles, independent of other units, by closing the valve.

9. The water treatment system according to claim 3, wherein
at least channels are sterilized, disinfected and antisepticized by at least any of the sterilization device, the disinfection device, and the sterilizer as needed to maintain the second to fifth units or to discharge water from the units.

10. The water treatment system according to claim 1, wherein
the sensor data is the data required for water treatment, including at least any of water quality, volume of water, environmental measurement, sensor position, users, date and time, and electricity consumption.

11. The water treatment system according to claim 3, wherein
each of the first to fifth units includes a micro-control unit,
the micro-control unit acquires sensor data from the sensor, regardless of the number of the sensors increased or decreased, and transmits the data to the control device,
the control device and the micro-control unit provided at each of the first to fifth units are connected to micro-control units provided at other units in wired or wireless manner to communicate with the micro-control units in other units and an external micro-control unit,
the water treatment system sets the micro-control unit in each of the first to fifth units, rewrite and renew thresholds, control the control device in each of the first to fifth units, and transmit data from the micro-control unit to the control device,
the water treatment system defines one of the micro-control units and the control devices in the first to fifth units as a main micro-control unit and a main control device, respectively, and the main micro-control unit and the main control device perform centralized control of all the other micro-control units and all the other control devices in the first to fifth units, and
the centralized control controls the valves and all the devices operated based on electronic control in the first to fifth units.

12. The water treatment system according to claim 3, wherein
the data on used water quality, treatment state, usage state of a dirty water generation source and its position is visualized, and its sound is generated, and notifications and messages are given, regardless of locally, externally, or on a web site.

13. The water treatment system according to claim 3, wherein
the first to third units for treating and recycling dirty water generated can be used in any combinations, depending on the scale, and can be conveyed, mounted on vehicles, transported, expanded and reduced, and information on the water quality and the environment can be monitored by a sensor, and thresholds can be set and controlled based on acquired information for automatic operation.

14. The water treatment system according to claim 1, further comprising a fifth unit that includes a decomposition treatment device for further decomposing and treating concentrated dirty water and impurities generated in the third unit.

15. The water treatment system according to claim 1, wherein the dirty water is treated and recycled when a water supply and drainage infrastructure fails to function.

16. The water treatment system according to claim 1, wherein the first to third units are used to provide toilets or restrooms when a tap water and sewerage system infrastructure fails to function.

\* \* \* \* \*